United States Patent
Yang et al.

(10) Patent No.: US 10,416,664 B2
(45) Date of Patent: Sep. 17, 2019

(54) METHOD FOR CONTROLLING AN UNMANNED AERIAL VEHICLE

(71) Applicant: Zerotech (Shenzhen) Intelligence Robot Co., Ltd, Shenzhen, Guangdong (CN)

(72) Inventors: Jianjun Yang, Beijing (CN); Qing Pu, Beijing (CN)

(73) Assignee: Zerotech (Shenzhen) Intelligence Robot Co., Ltd., Shenzhen (CN)

( * ) Notice: Subject to any disclaimer, the term of this patent is extended or adjusted under 35 U.S.C. 154(b) by 239 days.

(21) Appl. No.: 15/341,175

(22) Filed: Nov. 2, 2016

(65) Prior Publication Data

US 2017/0351253 A1 Dec. 7, 2017

(30) Foreign Application Priority Data

Jun. 2, 2016 (CN) .......................... 2016 1 0387847

(51) Int. Cl.
| | | |
|---|---|---|
| *G05D 1/00* | (2006.01) | |
| *B64C 39/02* | (2006.01) | |
| *B64D 47/08* | (2006.01) | |
| *G06F 3/01* | (2006.01) | |
| *G06K 9/00* | (2006.01) | |

(52) U.S. Cl.
CPC ......... *G05D 1/0016* (2013.01); *B64C 39/024* (2013.01); *B64D 47/08* (2013.01); *G05D 1/0033* (2013.01); *G06F 3/011* (2013.01); *G06F 3/012* (2013.01); *G06F 3/017* (2013.01); *G06K 9/0063* (2013.01); *G06K 9/00228* (2013.01); *B64C 2201/146* (2013.01)

(58) Field of Classification Search
CPC .. G05D 1/0016; G05D 1/0033; G05D 1/0038; G05D 1/0044; B64C 39/024; B64C 19/00; B64C 2201/14; B64C 2201/146; B64D 47/08; G06F 3/01; G06F 3/011; G06F 3/012; G06F 3/013; G06F 3/014; G06F 3/017; G06T 2207/30196; G06K 9/00228; G06K 9/0063
USPC ........................... 701/2, 3; 244/17.13, 17.26
See application file for complete search history.

(56) References Cited

U.S. PATENT DOCUMENTS

| | | | | |
|---|---|---|---|---|
| 9,663,227 B1* | 5/2017 | Lema | .................... | B64C 39/024 |
| 9,791,768 B2* | 10/2017 | Korenev | ................ | G03B 21/60 |
| 2010/0295760 A1* | 11/2010 | Somerville | .......... | G09G 3/3216 |
| | | | | 345/82 |
| 2010/0295861 A1* | 11/2010 | Somerville | .......... | G09G 3/3216 |
| | | | | 345/545 |
| 2013/0253733 A1* | 9/2013 | Lee | ......................... | B64C 19/00 |
| | | | | 701/2 |
| 2016/0101856 A1* | 4/2016 | Kohstall | ................ | G05D 1/101 |
| | | | | 244/17.13 |
| 2016/0349849 A1* | 12/2016 | Kwon | ..................... | G06F 3/011 |
| 2017/0161561 A1* | 6/2017 | Marty | ................ | G06K 9/00724 |
| 2017/0193605 A1* | 7/2017 | Narendran | .......... | G06Q 10/0631 |

(Continued)

*Primary Examiner* — Richard A Goldman
(74) *Attorney, Agent, or Firm* — Leydig, Voit & Mayer, Ltd.

(57) ABSTRACT

A method for controlling an unmanned aerial vehicle (UAV) includes: determining, by a processor, a change in a body portion of a user based on acquired images that include the body portion of the user; determining, by the processor, control data of the UAV based on the change in the body portion; and controlling, by the processor, the UAV based on the control data.

6 Claims, 7 Drawing Sheets

(56) References Cited

U.S. PATENT DOCUMENTS

| | | | |
|---|---|---|---|
| 2017/0233099 A1* | 8/2017 | Kuhara | B64D 47/02 |
| | | | 701/3 |
| 2017/0235308 A1* | 8/2017 | Gordon | G05D 1/0088 |
| | | | 701/2 |
| 2017/0337735 A1* | 11/2017 | Goslin | G06T 19/006 |
| 2017/0351253 A1* | 12/2017 | Yang | B64D 47/08 |
| 2017/0371410 A1* | 12/2017 | Boss | G06F 3/014 |
| 2017/0374351 A1* | 12/2017 | Doerre | B64C 39/024 |
| 2018/0059659 A1* | 3/2018 | Takeuchi | G05D 1/0022 |
| 2018/0081439 A1* | 3/2018 | Daniels | G06F 1/163 |
| 2018/0114058 A1* | 4/2018 | Kahn | G05D 1/0033 |
| 2018/0139152 A1* | 5/2018 | Shaw | H04L 49/1584 |
| 2018/0182092 A1* | 6/2018 | Drozdzal | G06K 9/00765 |
| 2018/0196419 A1* | 7/2018 | Wang | G05D 1/08 |

* cited by examiner

METHOD FOR CONTROLLING AN UNMANNED AERIAL VEHICLE

CROSS-REFERENCE TO RELATED APPLICATIONS

Priority is claimed to Chinese Patent Application No. 201610387847.9, filed on Jun. 2, 2016, the entire disclosure of which is hereby incorporated by reference herein.

FIELD

The present invention relates to the field of unmanned aerial vehicles (UAV), and particularly to a UAV, a method and apparatus for controlling a UAV.

BACKGROUND

Traditional control technology of UAV comprises remote control, mobile phone APP (Application) control, kinect motion control technology etc, which needs operators to hold some devices used for flight control, prevents the users from getting out of fixed devices, as a result, leads to restricted user experience and participation, and puts obstacles to the requirement and development of intelligent UAVs.

SUMMARY

In an exemplary embodiment, the invention provides a method for controlling an unmanned aerial vehicle (UAV), comprising: determining, by a processor, a change in a body portion of a user based on acquired images that include the body portion of the user; determining, by the processor, control data of the UAV based on the change in the body portion; and controlling, by the processor, the UAV based on the control data.

In another exemplary embodiment, the invention provides a non-transitory computer-readable medium having processor-executable instructions stored thereon for controlling an unmanned aerial vehicle (UAV), the processor-executable instructions, when executed, facilitating performance of the following: determining a change in a body portion of a user based on acquired images that include the body portion of the user; determining control data of the UAV based on the change in the body portion; and controlling the UAV based on the control data.

In yet another exemplary embodiment, the invention provides an unmanned aerial vehicle (UAV), comprising: a memory; and a processor coupled to the memory, the processor being configured to, based on instructions stored in the memory: determine a change in a body portion of a user based on acquired images that include the body portion of the user; determine control data of the UAV based on the change in the body portion; and control the UAV based on the control data.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

Reference symbols: unmanned aerial vehicle control apparatus 100, acquisition module 101, first calculation module 102, second calculation module 103, control module 104, unmanned aerial vehicle 200, image collection unit 210, memory 220, memory controller 230, processor 240, peripheral interface 250, communication bus/signal lines 260, body portion change determination module 301, control data acquisition module 302, control module 303

DETAILED DESCRIPTION

Embodiments of the present invention provide a UAV, a method and apparatus for controlling a UAV, capable of getting users out of traditional hand-held control devices.

In a first aspect, a method for controlling a UAV is provided in an embodiment of this invention, the method comprising: determining a change in a body portion of a user based on acquired images that include the body portion of the user; determining control data of the UAV based on the change in the body portion; controlling the UAV based on the control data.

Optionally, the change in the body portion comprises a change in posture of the body portion and/or a change in position of the body portion.

Optionally, the method further acquiring a plurality of image frames each including the body portion of the user.

Optionally, the body portion of the user comprises a hand or face portion of the user;
determining a change in a body portion of a user based on acquired images each including the body portion of the user comprises: processing a plurality of image frames to obtain coordinate values of the hand or face portion in each image frame; determining a change in coordinate values of the hand or face portion based on the coordinate values of the hand or face portion in the plurality of image frames;
determining control data of the UAV based on the change in the body portion comprises obtaining control data of the UAV based on the change in coordinate values of the hand or face portion.

Optionally, determining a change in coordinate values of the hand or face portion based on the coordinate values of the hand or face portion in the plurality of image frames comprises performing subtraction on hand coordinate values in two sequential image frames among the plurality of image frames to obtain a pixel difference of hand movement; obtaining control data of the UAV based on the change in the coordinate values of the hand or face portion comprises obtaining a value of a trigger signal from the pixel difference, wherein the value of the trigger signal is used as the control data of the UAV.

Optionally, obtaining a value of a trigger signal from the pixel difference comprises: when the pixel difference is greater than a predetermined first threshold value, discarding the pixel difference and keeping the value of the trigger signal unchanged; when the pixel difference is greater than a predetermined second threshold value and is less than or equal to the predetermined first threshold value, controlling a counter to perform accumulated counting, when the accumulated value of the counter is greater than a count threshold value, controlling the counter to reset and increasing the value of the trigger signal.

Optionally, the image including a hand portion of a user further comprises a face portion of the user, wherein the second threshold value is a pixel length of the face portion of the user and the first threshold value is a pixel length of an arm of the user.

Optionally, the step of controlling the UAV based on the control data comprises: transmitting the control data to a flight control system of the UAV to enable the flight control system to control the UAV based on the control data.

According to another aspect of this invention, an apparatus for controlling a UAV is provided, comprising: a body portion change determination module for determining a change in a body portion of a user based on acquired images that include the body portion of the user; a control data acquisition module for determining control data of the UAV based on the change in the body portion; a control module for controlling the UAV based on the control data.

Optionally, the change in the body portion comprises a change in posture of the body portion and/or a change in position of the body portion.

Optionally, the apparatus further comprises an acquisition module for acquiring a plurality of image frames each including the body portion of the user.

Optionally, the body portion of the user comprises a hand or face portion of the user; the body portion change determination module comprises a first calculation module for processing the plurality of image frames to obtain coordinate values of the hand or face portion in each image frame; a second calculation module for determining a change in coordinate values of the hand or face portion based on the coordinate values of the hand or face portion in a plurality of image frames;
wherein the control data acquisition module obtains control data of the UAV based on the change in coordinate values of the hand or face portion.

Optionally, the second calculation module is used for performing subtraction on coordinate values of a hand portion in two sequential image frames among the plurality of two image frames to obtain a pixel difference of hand movement; the control data acquisition module obtains a value of trigger signal from the pixel difference, wherein the trigger signal is used as the control data.

Optionally, the second calculation module is used to, after the pixel difference has been obtained and when the pixel difference is greater than a predetermined first threshold value, discard the pixel difference and keep the value of the trigger signal unchanged; if the pixel difference is greater than a predetermined second threshold value and is less than or equal to the predetermined first threshold value, control a counter to perform accumulated counting; when the count value of the counter is greater than a count threshold value, control the counter to reset and increase the value of the trigger signal.

Optionally, the image including a hand portion of a user further comprises a face portion of the user, wherein the second threshold value is a pixel length of the face portion of the user and the first threshold value is a pixel length of an arm of the user.

Optionally, the control module is used to transmit the control data to a flight control system of the UAV to enable the flight control system to control the UAV based on the control data.

According to still another aspect of this invention, a UAV is provided, comprising: memory; a processor coupled to the memory, the processor configured to, based on instructions stored in the memory, carry out a following UAV control method:
determining a change in a body portion of a user based on acquired images each including the body portion of the user;
determining control data of the UAV based on the change in the body portion; controlling the UAV based on the control data.

A UAV, a method and apparatus for controlling a UAV are provided in embodiments of this invention, the method for controlling a UAV comprising: acquiring a plurality of image frames each including a hand or face portion of a user; processing the plurality of image frames to obtain coordinate values of the hand or face portion in each image frame; calculating with the coordinate values of the hand or face potion to obtain control data; controlling the UAV based on the control data. With the UAV, the method and apparatus for controlling a UAV provided in embodiments of this invention, the motion pattern of the UAV may be controlled with a change in the user's hand or face action, so that user experience may be improved.

Exemplary embodiments are described in detail below with reference to the accompanying drawings.

Below, a clear and complete description will be given for the technical solution of an embodiment of the present invention with reference to the figures. It will be appreciated that exemplary embodiments of the present invention, rather than all embodiments thereof, are described herein. In general, the components of the present invention, as generally described and illustrated in the figures and described in the embodiments herein, may be arranged and designed in a wide variety of different configurations. Therefore, the detailed description of exemplary embodiments of this invention provided in the accompanying drawings is not intended to limit the scope of the claimed invention, but rather these embodiments are merely exemplary. Based on these exemplary embodiments, those of ordinary skill in the art may understand other embodiments without creative effort.

Note that similar reference symbols and characters correspond to similar items below, and thus once defined in a figure, no further definition and explanation will be given for following figures.

Current UAV control needs manual control of operators. Although there are some sophisticated gesture and face recognition techniques available, these techniques are only limited to traditional researches or some applications on computers without integration with mobile hardware devices, such as UAVs. The inventors of the present invention applied a change in body posture or position into UAV control, and as a result, a good control effect is obtained.

Figure 1:
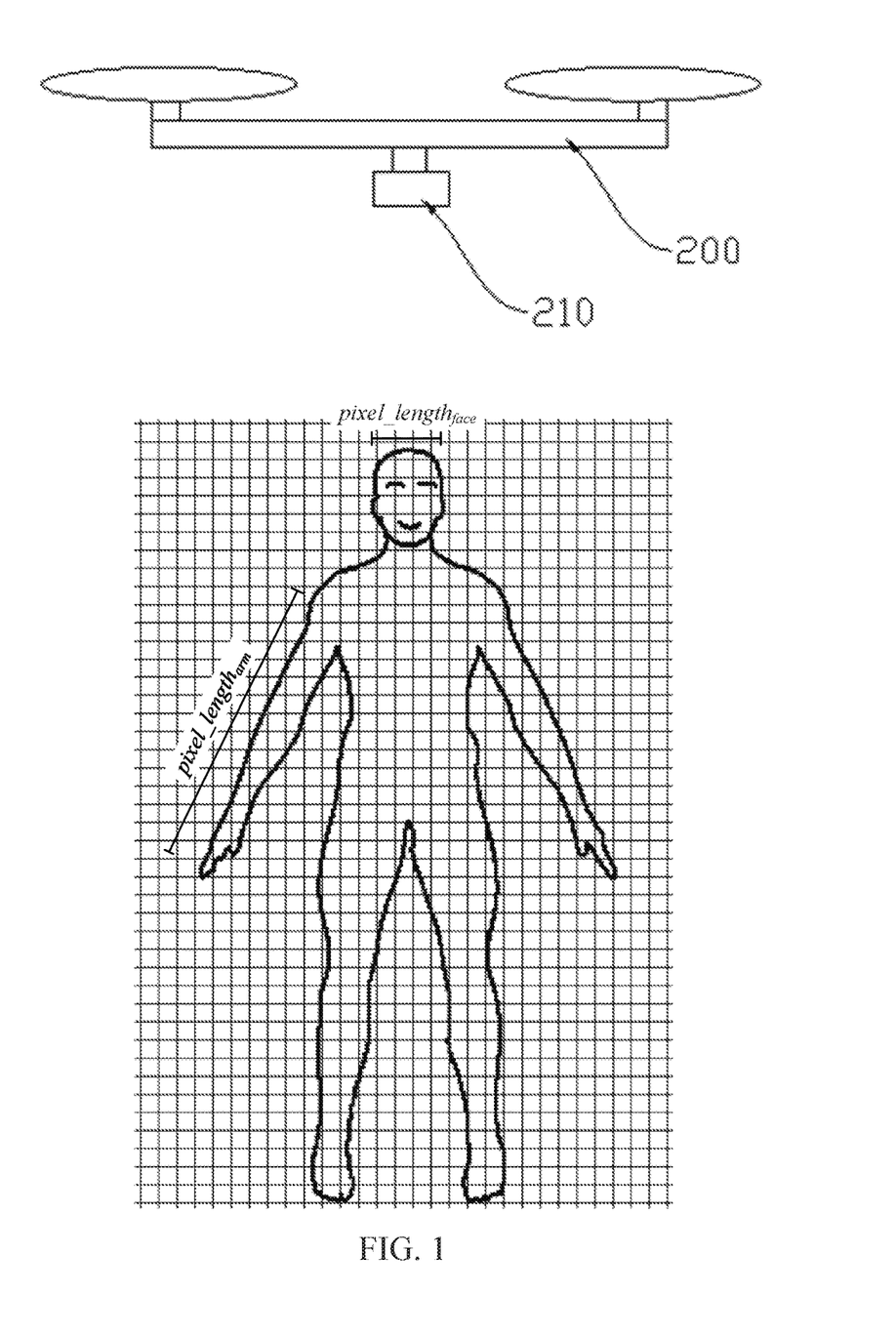
FIG. 1 is a schematic view showing an application scenario of a UAV, an unmanned aerial vehicle control method and apparatus provided in an embodiment of this invention.

Referring to FIG. 1, FIG. 1 is a schematic view showing an application scenario of a UAV, a method and apparatus for controlling a UAV provided in an embodiment of this invention. An unmanned aerial vehicle (UAV) 200 comprises an image collection unit 210, which may be a camera or a video camera. Images of a user, including a hand or face portion of the user, may be continuously collected using the image collection unit 210. It should be noticed that the hand portion of the user may be a palm or an arm of the user or a combination thereof, which is not limited in the embodiments of the present invention. It should be appreciated that the image collection unit 210 may continuously collect images of the user to form a video stream. A UAV control apparatus 100 is installed in memory of a UAV and includes one or more software modules executed by the processor. When the user moves his/her hand or face portion, images before and after the hand or face movement are collected by the image collection unit 210. The UAV control apparatus 100 provided in the embodiment of this invention performs a process and calculation on the images collected by the image collection unit 210 to control the motion pattern of the UAV 200.

Figure 2:
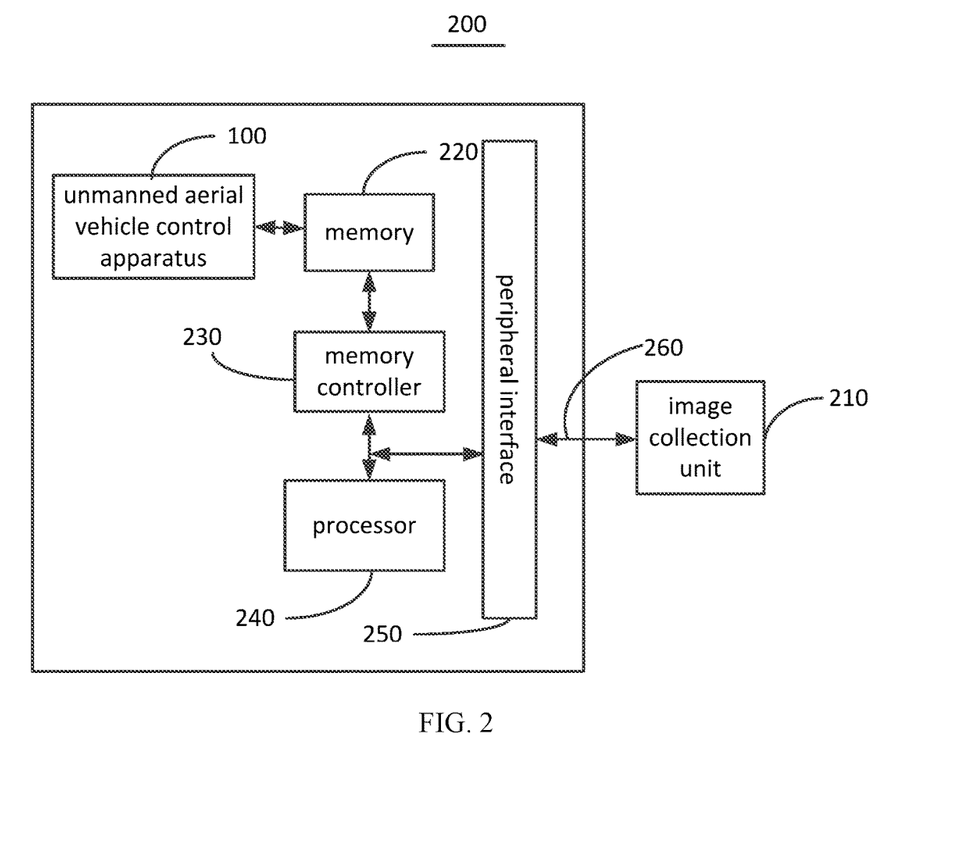
FIG. 2 is a block diagram of the structure of the UAV provided in an embodiment of this invention.

Referring to FIG. 2, FIG. 2 is a block diagram of the structure of the UAV 200 provided in an embodiment of this invention. As shown in FIG. 2, the UAV 200 comprises an image collection unit 210, memory 220, a memory controller 230, one or more (only one is shown in the figure) processors 240, a peripheral interface 250, and a UAV control apparatus 100. These components communicate with each other through one or more communication buses/signal lines 260.

The UAV control apparatus 100 is installed in memory 220 and includes one or more software modules executed by the processor 240.

The memory 220 may be used to store software programs and modules, for example, program instructions/modules corresponding to the UAV control method and apparatus of embodiments of the present invention. The processor 240 executes software programs and modules stored in memory 220 to perform various functions and data processing, for example, the UAV control method provided in embodiments of the present invention.

The memory 220 may comprise high speed random access memory, or may comprise non-volatile memory, such as one or more magnetic storage devices, flash memory or other non-volatile solid-state storage devices. The processor 240 and other components may access the memory 220 under the control of the memory controller 230.

The peripheral interface 250 couples various input/output devices to the processor 240 and memory 220. In some embodiments, the peripheral interface 250, the processor 240 and the memory controller 230 may be implemented in a single chip. In other embodiments, they may be implemented in separate chips.

It should be appreciated that the structure shown in FIG. 2 is merely for illustration. The UAV 200 may further comprise more or less components than that shown in FIG. 2, or may have a configuration different from that shown in FIG. 2. The various components shown in FIG. 2 may be implemented in hardware, software or a combination thereof.

Figure 3A:
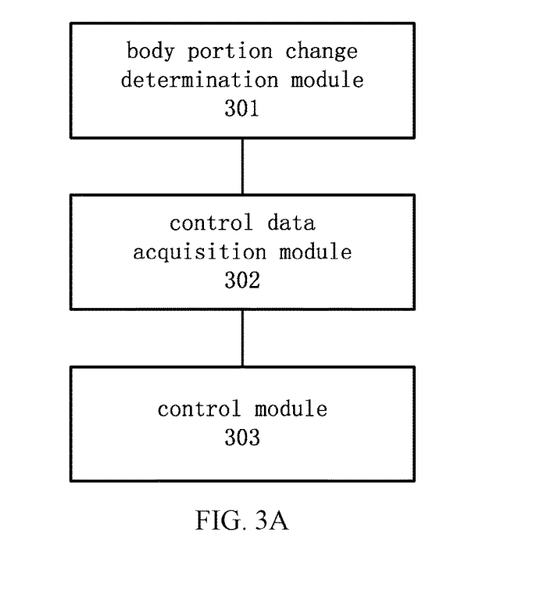
FIG. 3A is a schematic view showing function modules of an apparatus for controlling a UAV provided in one embodiment of this invention.

FIG. 3A is a schematic view showing function modules of an apparatus for controlling a UAV provided in one embodiment of this invention. The UAV control apparatus comprises a body change determination module 301, a control data acquisition module 302, and a control module 303.

The body change determination module 301 is used to determine a change in a body portion of a user based on acquired images each including the body portion of the user. The change in the body portion comprises a change in posture of the body portion and/or a change in position of the body portion. The body portion of the user comprises for example a hand or face portion of the user.

The control data acquisition module 302 is used to determine control data of the UAV based on the change in the body portion.

The control module 303 is used to control the UAV based on UAV control data that has been acquired from the control data acquisition module 302.

In the above embodiment, the body portion change determination module determines a change in a body portion, sends to the control data acquisition module that determines control data of the UAV based on the change in the body portion, thereby the control module controls the UAV based on the control data of the UAV. With no need for the operator holding a handheld device for flight control, the operator may free his hands from operation on fixed devices, more intelligent UAV control may be realized, and user experience and participation may be improved.

Figure 3B:
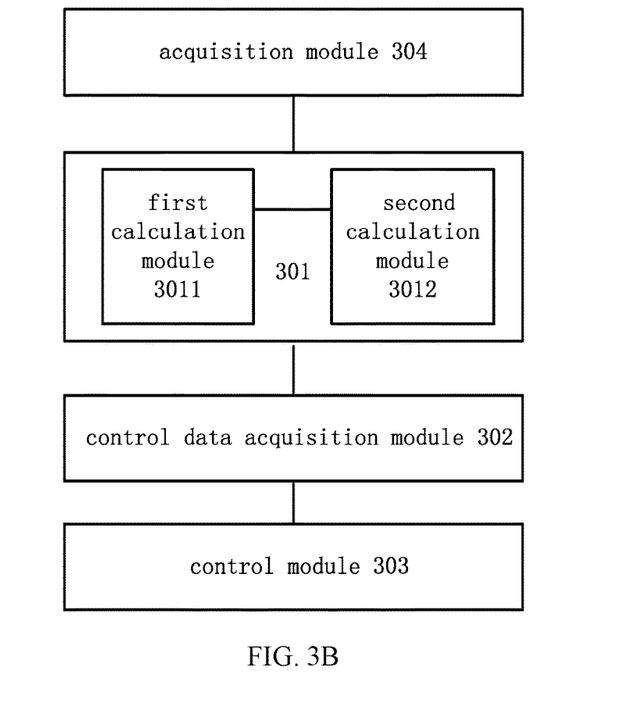
FIG. 3B is a schematic view showing function modules of an apparatus for controlling a UAV provided in another embodiment of this invention.

FIG. 3B is a schematic view showing function modules of an apparatus for controlling a UAV provided in another embodiment of this invention. The UAV control apparatus comprises an acquisition module 304, a body change determination module 301, a control data acquisition module 302, and a control module 303.

Wherein, the acquisition module 304 is used for acquiring a plurality of image frames that include a body portion of a user. The body portion of the user comprises for example a hand or face portion of the user.

In an embodiment, the body portion change determination module 301 comprises a first calculation module 3011 for processing at least two image frames to obtain coordinate values of the hand or face portion in each image frame; a second calculation module 3012 for determining a change in coordinate values of the hand or face portion based on the coordinate values of the hand or face portion in a plurality of image frames. The control data acquisition module 302 obtains control data of the UAV based on the change in coordinate values of the hand or face portion.

In the above embodiment, sufficient utilization of gesture and face recognition technology and integration with a mobile hardware device such as UAV may lead to better UAV control.

In an embodiment, the second calculation module 3012 is used for performing subtraction on coordinate values of a hand portion in two sequential image frames among the at least two image frames to obtain a pixel difference of hand movement, and send it to the control data acquisition module 302; the control data acquisition module 302 obtains a value of a trigger signal based on the pixel difference outputted from the second calculation module 3012, and uses the value of the trigger signal as the control data. In an embodiment, the second calculation module 3012 is used to, after the pixel difference has been obtained and if the pixel difference is greater than a predetermined first threshold value, discard the pixel difference and not send control data to the control data acquisition module 302, the control data acquisition module 302 keeps the value of the trigger signal unchanged; if the pixel difference is greater than a predetermined second threshold value and is less than or equal to the predetermined first threshold value, sends the control data to the control data acquisition module 302, the control data acquisition module 302 controls a counter to perform accumulated counting; when the accumulated value of the counter is greater than a count threshold value, the control data acquisition module 302 controls the counter to reset and increase the value of the trigger signal. In the above embodiment, through filtering the pixel difference with a threshold to remove influence of glitch or abnormal data, more stable and smooth control may be realized.

Figure 3C:
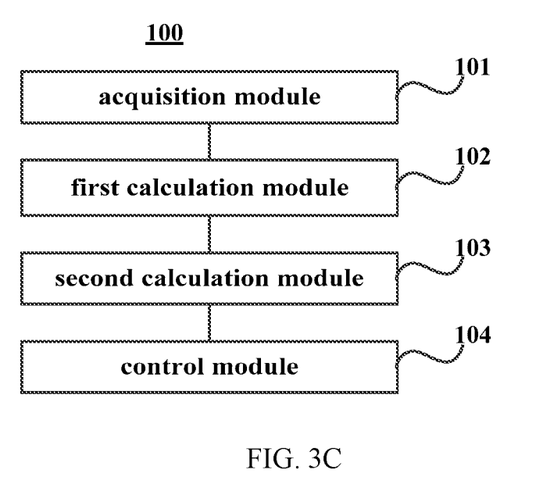
FIG. 3C is a schematic view showing function modules of an apparatus for controlling a UAV provided in still another embodiment of this invention.

FIG. 3C is a schematic view showing function modules of a UAV control apparatus 100 provided in still another embodiment of this invention. The UAV control apparatus 100 comprises an acquisition module 101, a first calculation module 102, a second calculation module 103 and a control module 104.

The acquisition module 101 is used for acquiring at least two image frames each image frame including a hand or face portion of a user.

The images acquired by the acquisition module 101 are collected by an image collection unit 210 of the UAV 200. After acquiring the images, the acquisition module 101 transmits the plurality of image frames to the first calculation module 103. Preferably, before transmitting the plurality of image frames to the first calculation module 103, a pre-processing may be performed on the image frames by a pre-processing module, including but not limited to image stabilizing and cutting, for example, modifying a 2064*1548 video stream to 720P or 1080P images to make those images more stable.

The first calculation module 102 is used for processing the plurality of image frames to obtain coordinate values of the hand or face portion in each image frame. For an image of a hand portion of the user, the first calculation module 102 may be a gesture recognition module for recognizing a hand portion of the user to obtain coordinate values of a gesture in the image. For an image of a face portion of the user, the first calculation module 102 may be a face recognition module for recognizing a face portion of the user to obtain coordinate values of the face portion in the image. Gesture recognition using a gesture recognition module and face recognition using a face recognition module are prior art and will not be repeated herein. After the first calculation module 102 has processed the image, coordinate values of the hand portion or face portion of the user in the image are obtained, for example (pixel_x, pixel_y).

The second calculation module 103 is used for calculating with the face coordinate values or the hand coordinate values to obtain control data.

When the user controls the motion of the UAV 200 by a hand movement, as an embodiment, calculating with the face coordinate values or the hand coordinate values by the second calculation module 103 comprises performing subtraction on hand coordinate values in two image frames among the plurality of image frames to obtain a hand movement pixel difference, for example (Δpixel_x, Δpixel_y). In this embodiment, the two image frames are separated by three frames. Note that separating three frames between two frames is determined according to test effect and card performance, in other situations, the two frames may be separated by another number of frames, for example, four frames. The pixel difference is a movement distance value of the hand portion of the user. With a calculation on the horizontal axis as an example, provided that the coordinate values in each of these two frames are (20, 40) and (30, 40) in centimeters respectively, a movement distance of the hand portion is 30−20=10 cm.

In order to ensure that no glitch exits in pixel differences outputted from the second calculation module 103, i.e., to flatten a plurality of pixel differences, in this embodiment, the second calculation module 103 performs filtering on pixel differences before performing a calculation on the pixel differences to remove glitches or spikes, so as to get more smooth control values and realize stable movement of the UAV. For example, if coordinate values acquired by the first calculation module 102 are:

10, 20, 30, 60, pixel differences obtained by the second calculation module are: 10, 10, 30.

Among these pixel differences, value 30 is far larger than the remaining two values (10), and thus can be considered as a glitch. To remove this glitch, a flattening process may be performed on these pixel differences. Through changing value 60 to a smaller value, for example, 40, the pixel differences become 10, 10, and 10. Filtering performed by the second calculation module 103 on the pixel differences may be expressed in an equation $\Delta Y_n = A \times X_n + (1-A)\Delta Y_{n-1}$, wherein $X_n$ is the coordinate value of the hand portion, $\Delta Y_n$ is a pixel difference after filtering, $\Delta Y_{n-1}$ is a pixel difference after a previous filtering process, A is a probability parameter, the value of which is determined based on actual needs, and in general is 0.2.

The second calculation module 103 is further used to, after the pixel differences have been obtained; obtain control data according to the pixel differences. In this embodiment, the control data is a value of a trigger signal. The second calculation module 103 is further used to transmit the trigger signal to the control module 104. The control module 104 is used to transmit the trigger signal to a flight control system of the UAV. The flight control system control the motion state of the UAV 200 according to the value of the trigger signal. For example, provided that a change in the value of the trigger signal corresponds to a movement distance and direction of the UAV 200. A particular example will be given below, it may be specified that once the value of the trigger signal is changed by 1, the UAV moves 20 cm, the movement and direction of the UAV 200 is dependent on the positive and negative of the changed value of the trigger signal, for example, it may be specified when the value of the trigger signal increases, the UAV 200 moves to the right, when the trigger signal decreases, the UAV 200 moves to the left.

The process of obtaining a trigger signal from a pixel difference by the second calculation module 103 comprises: if the pixel difference meets a predetermined condition, performing accumulated counting by the second calculation module 103 by a predetermined increment, wherein the predetermined increment may be 1, 2 or 3, which is not limited herein. Preferably, the second calculation module 103 is used to control a counter to perform accumulated counting by a predetermined increment, when the accumulated value of the counter is greater than a count threshold, the second calculation module controls the counter to reset and increases the value of the trigger signal by a predetermined increment. Similarly, the increment of the trigger signal may be 1, 2, 3 etc., and the present embodiment does not have limitation thereof. In this embodiment, a counter is used to count and the value of the trigger signal is increased only if the counted value has reached a threshold because, in practical operation, mistakes may occurs in hand portion recognition performed by the first calculation module 102. For example, if an object in a color similar to that of the hand of the user moves close to the hand of the user and is recognized by the first calculation module 102 as the hand of the user, a pixel difference calculated by the first calculation module 102 may meet a predetermined condition, as a result, the second calculation module 103 increases the value of the trigger signal. However, as a fact, the user has not moved his hand or the hand movement pixel difference does not meet the predetermined condition. In another situation, the user wants to stretch his arm and it is not intended to control the UAV 200, however, this stretch is recognized by the first calculation module 102 and the second calculation module 103 still increases the trigger signal, causing that the UAV 200 is triggered by mistake. To prevent false triggering of the UAV 200, accumulated counting is introduced in this embodiment to increase the value of the trigger signal. Through accumulated counting, the value of the trigger signal is increased only if the counted value has reached a threshold value. The UAV is triggered to make a corresponding movement only if the number of times the pixel difference has met a predetermined condition reaches a certain amount, which may effectively prevent false triggering of the UAV 200.

Below, the predetermined condition that will be met by the pixel difference will be introduced in detail.

The second calculation module 103 stores a first threshold value and a second threshold value. When a pixel difference is greater than the second threshold value and less than or equal to the first threshold value, the pixel difference is considered as meeting the predetermined condition. In an embodiment of this invention, the second threshold value is a pixel length of the face portion of the user (e.g., pixel length$_{face}$ as depicted in FIG. 1). To control the movement of the UAV 200 by gesture, the images obtained further comprise a face portion of the user. The significance of obtaining a pixel length of the face portion is that, the size of the hand portion in the image collected by the image collection unit is different as the distance between the UAV 200 and the user varies. For example, provided that the user moves his hand by a distance of 20 cm, if the distance between the UAV 200 and the user is 10 m, a pixel difference on the image reflecting this hand movement is 5; however, if the distance between the UAV 200 and the user is 5 m, a pixel difference on the image reflecting this hand movement is 10. Given an unchanged movement distance of the hand portion, on images collected by the UAV 200, the hand movement pixel length varies, however. If a second constant threshold value is set, an uncorrected result will be obtained. In this embodiment, a reference variable, i.e., a face pixel length is set. The face pixel length varies in the images as the UAV 200 moves farther or closer, which is used as a second threshold value because the hand movement pixel difference and the pixel length of the face portion of the user always change in the same scale, when the hand movement pixel difference in an image is greater than the second threshold value, the second calculation module 103 performs counting. Below the selection of the first threshold value will be introduced in detail: the first threshold value is also a variable, in this embodiment, the first threshold value is the pixel length of the user's arm (e.g., pixel length$_{arm}$ as depicted in FIG. 1). It will be appreciated that the pixel length of the user's arm may change; however, the actual length of the user's arm may not change apparently. When the user stands still, the movement distance of the arm cannot exceed the length of the arm, the first threshold value is set to prevent the first calculation module from falsely recognizing a gesture of the user. If a pixel difference calculated by the second calculation module 103 is greater than the first threshold value, it indicates a false recognition of the first calculation module 102, for example, another object in a color closer to the that of the hand of the user has been recognized as the hand of the user, causing that the pixel length of the arm recognized is too large, which indicates that this is a false recognition and the pixel difference obtained will be discarded. In practice, because the user may have his arm curled, in which case the first calculation module 102 cannot accurately calculate the pixel length of the user's arm, as a result, the value of the first threshold value is not correct. In order to solve this problem, in this embodiment, the arm length of the user is obtained in advance, and then a ratio relationship between the user's arm and the user's face is obtained through calculating a ratio between the pixel length of the user's arm and the pixel length of the user's face. For example, if it is determined that the length of the user's arm is N times the length of the user's face, because it is easier to calculate the pixel length of the user's face and a more accurate calculation may obtained, the pixel length of the user's face may be used as a reference, which is multiplied by N to get a pixel length of the user's arm. As a consultation, the first threshold value=N*the second threshold value, wherein the second threshold value is the pixel length of the user's face, N is a ratio between the user's arm and the user's face, the first threshold value is the pixel length of the user's arm.

The recognition of the user's hand portion may be further extended to the recognition of a gesture of the user's finger or palm, by which the UAV 200 is controlled to make an action response. For example, when the user stretches his palm, clenches a fist, or shows a V shaped gesture with his fingers, it may represent different actions of the UAV 200, for example, taking off, landing, taking a picture, or video recording.

When the user controls the UAV 200 by face, the second calculation module 103 is used to perform a calculation on coordinate values of a face portion of the user: particularly, the second calculation module 103 performs filtering on coordinate values of the face portion to remove glitches in the coordinate values. The process of filtering will not be described in detail herein, and coordinate values of the face portion obtained after filtering are used as the control data. Coordinate values of the face portion of the user comprise coordinate values of an upper left corner and coordinate values of a lower right corner of a face frame in the image. Herein, the face frame is a rectangular frame formed by a maximum horizontal size of the face portion and a maximum vertical size of the face portion, similar to a focus frame for face focusing in a camera. The process of calculating coordinate values of a face portion by the second calculation module 103 differs from the process of calculating coordinate values of a hand portion of the user in that, after a filtering process has been performed on coordinate values of the face portion, the second calculation module 103 directly transmits filtered coordinate values of the face portion to the control module 104, the control module 104 transmits the coordinate values to the flight control system of the UAV 200, so that the flight control system of the UAV 200 controls the motion state of the UAV 200 based on a position change of the coordinate values of the face portion in the images. For example, when the flight control system has detected that the face frame becomes larger in an image, e.g., when the flight control system has detected that the pixel length between the coordinate values of the upper left corner of the face frame and the coordinate values of the lower right corner of the face frame become longer, it controls to change the pitch angle of the UAV 200 to move the UAV 200 away from the user. When the flight control system has detected that the face frame becomes smaller in an image, e.g., when the flight control system has detected that the pixel length between the coordinate values of the upper left corner of the face frame and the coordinate values of the lower right corner of the face frame become shorter, it controls to change the pitch angle of the UAV 200 to move the UAV 200 closer to the user. When the flight control system has detected that the face frame moves upward in an image, it controls the UAV 200 to move upward; when the flight control system has detected that the face frame moves downward, it controls the UAV 200 to move downward; when the flight control system has detected that the face frame moves to the left, it controls the UAV 200 to move left; when the flight control system has detected that the face frame moves to the right, it controls the UAV 200 to move right, so as to realize six-degree-of-freedom control of the UAV 200 (upward, downward, left, right, front and back).

Figure 4A:
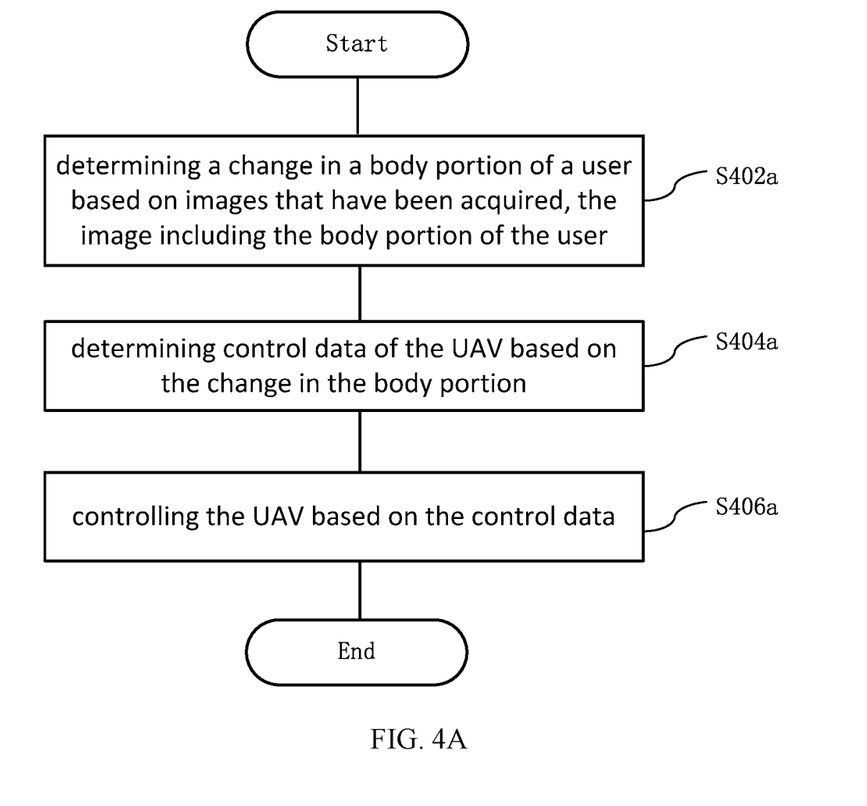
FIG. 4A is a flow chart of the method for controlling a UAV provided in an embodiment of this invention.

FIG. 4A is a flow chart of the method for controlling a UAV provided in an embodiment of this invention. The method for controlling a UAV provided in this embodiment comprises the following steps:

step 402*a*: determining a change in a body portion of a user based on images that have been acquired, the image including the body portion of the user; the change in the body portion comprises for example a change in posture of the body portion and/or a change in position of the body portion.

step 404*a*: determining control data of the UAV based on the change in the body portion;

step 406*a*: controlling the UAV based on the control data.

Figure 4B:
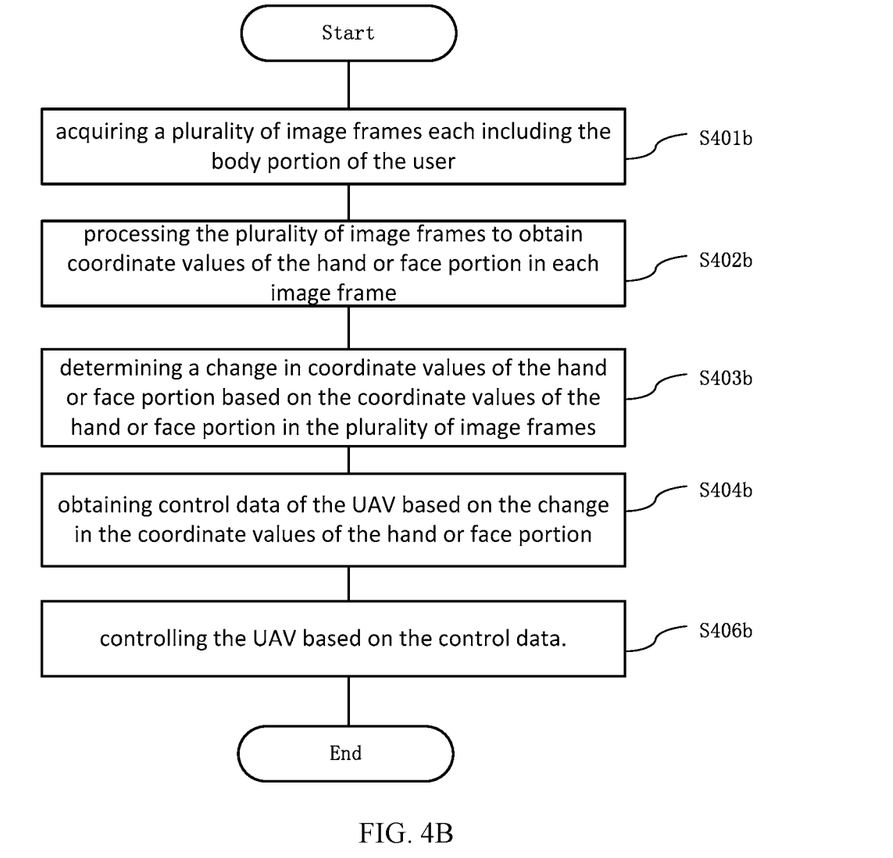
FIG. 4B is a flow chart of the method for controlling a UAV provided in another embodiment of this invention.

FIG. 4B is a flow chart of the method for controlling a UAV provided in an embodiment of this invention. The method for controlling a UAV provided in this embodiment comprises the following steps:

step 401*b*: acquiring a plurality of image frames each including the body portion of the user. The body portion of the user comprises for example a hand or face portion of the user.

step 402*b*: processing the plurality of image frames to obtain coordinate values of the hand or face portion in each image frame;

step 403*b*: determining a change in coordinate values of the hand or face portion based on the coordinate values of the hand or face portion in the plurality of image frames, for example, performing subtraction on coordinate values of a hand portion in two image frames among the at least two image frames to obtain a hand movement pixel difference;

step 404*b*: obtaining control data of the UAV based on the change in the coordinate values of the hand or face portion, for example, obtaining a value of a trigger signal from the pixel difference of hand movement, wherein the trigger signal is used as the control data.

step 406*b*: controlling the UAV based on the control data.

Figure 4C:
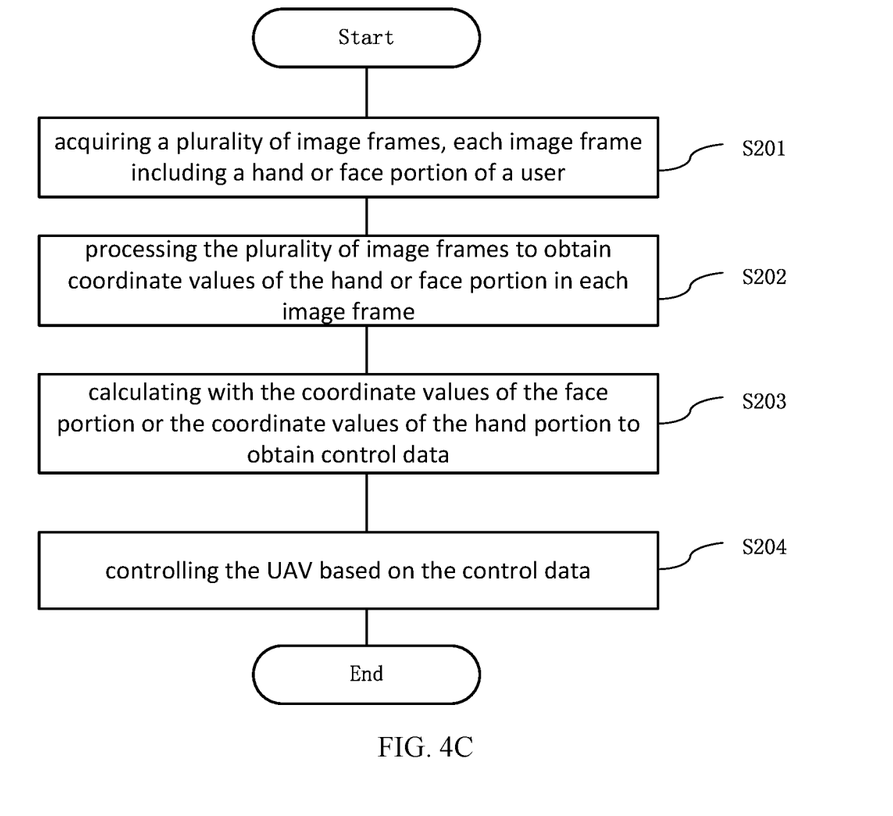
FIG. 4C is a flow chart of the method for controlling a UAV provided in still another embodiment of this invention.

FIG. 4C is a flow chart of the method for controlling a UAV provided in another embodiment of this invention. The method for controlling a UAV provided in this embodiment comprises the following steps:

step S201: acquiring a plurality of image frames, each image frame including a hand or face portion of a user.

In this embodiment, step S201 may be executed in the acquisition module 101. The acquired images are collected by an image collection unit of the UAV 200, such as a video camera or a camera. Note that when the motion state of the UAV 200 is controlled through recognizing a hand action of the user, the plurality of image frames obtained comprise a hand portion and a face portion of the user simultaneously. To control the motion of the UAV 200 through face recognition, it is only required to recognize a face portion of the user. After the images have been acquired, a pre-process may be performed on these images, including but not limited to image stabilizing and cutting, to enable those images to meet better the requirement of subsequent steps.

step S202: processing the plurality of image frames to obtain coordinate values of the hand or face portion in each image frame.

In this embodiment, step S202 may be executed by the first calculation module 102. One or more coordinate values of the hand or face portion may be obtained, for example, for coordinate values of a hand portion of the user, some coordinate values that may outline the profile of the hand portion may be selected, or coordinate values of a geometric center point of the hand portion or coordinate values of a specific point on the hand portion may be selected; for coordinate values of a face portion, coordinate values of an upper left corner and coordinate values of a lower right corner of a face frame may be selected. The embodiments of this invention do not have any limitations on the number and selection of the coordinate values.

step S203: calculating with the coordinate values of the face portion or the coordinate values of the hand portion to obtain control data.

In this embodiment, step S203 may be executed by the second calculation module 103. Calculating coordinate values of the face portion comprises performing a filtering process on the coordinate values of the face portion, removing glitches from the coordinate values, and using the filtered coordinate values of the face portion as the control data. Calculating coordinate values of a hand portion comprises performing subtraction on coordinate values of the hand portion in two image frames among the plurality of image frames to obtain a pixel difference of hand movement. Preferably, a filtering process may be performed on pixel differences to remove glitches from the pixel differences. The filtering process may be particularly expressed in an equation $\Delta Y_n = A \times X_n + (1-A)\Delta Y_{n-1}$, wherein $X_n$ is the coordinate value of the hand portion, $\Delta Y_n$ is a pixel difference after filtering, $\Delta Y_n$ is a pixel difference after a previous filtering process, A is a probability parameter, the value of which is determined based on actual needs, and in general is 0.2. From the filtered pixel differences, control data may be obtained, which is a trigger signal. The process of obtaining a trigger signal from a pixel difference comprises: if the pixel difference meets a predetermined condition, performing accumulated counting by a predetermined increment, wherein the predetermined increment may be 1, 2 or 3, which is not limited herein. When the accumulated value is greater than a count threshold value, the count value is reset and the value of the trigger signal is increased. Similarly, the increment of the trigger signal may be 1, 2, 3 etc., and the present embodiment does not have limitation thereof. The predetermined condition comprises a first predetermined threshold value and a second predetermined threshold value, if a pixel difference is larger than the second threshold value and less than or equal to the first threshold value, the pixel difference is considered as meeting the predetermined condition. The second threshold value is a pixel length of the face portion of the user, the first threshold value is a pixel length of the arm of the user. If a pixel difference is larger than the first threshold value, the pixel difference is discarded and the value of the trigger signal is kept unchanged.

step S204: controlling the UAV based on the control data.

In this embodiment, step S204 may be executed by the control module 104. After the control data has been obtained, the control data is transmitted to the flight control system of the UAV 200, so that the flight control system controls the UAV 200 based on the control data. The control data may be transmitted using a flight control interface function in the flight control system. For control data obtained through calculation with coordinate values of a hand portion of the user, the flight control interface function may be:

flight_control_ap_send_track_result(HandoffsetX,HandoffsetY,Quality)

HandoffsetX, HandoffsetY are outputted coordinate values, and Quality is a confidence coefficient.

For control data obtained through calculation with coordinate values of a face portion of the user, the flight control interface function may be:

flight_control_ap_send_target_track_result(LocalFrameCount, TX0, TY0, TX1, TY1, Quality)

LocalFrameCount is the number of image frames, TX0, TY0, TX1, TY1 are coordinate values of the upper left corner and lower right corner of a face frame, and Quality is a confidence coefficient.

According to the method and apparatus of controlling a UAV provided in embodiments of the present invention, through acquiring images of a hand or face portion of a user, processing and calculation with the acquired images to obtain control data, the UAV's motion state may be controlled based on the control data, the user may control the UAV 200 only by a change in his/her hand or face action, so that the user may get out of the operation on traditional hand-held control devices, leading to improved user experience and participation.

Note that, in this description, the use of relational terms, if any, such as first and second and the like are used solely to distinguish one from another entity or action without necessarily requiring or implying any actual such relationship or order between such entities or actions. Further, terms "include", "comprise" or their any other variations are intended to encompass non-exclusive composition, so that a process, method, product or device comprising a series of factors may comprise not only these factors, but also other factors that are not listed explicitly, or factors intrinsic to this process, method, product or device. Without limitation, a factor defined by wording "comprise one . . . " does not exclude the existence of other same factors in a process, method, product or device comprising such factor.

The aforementioned contents are only preferably embodiments of this invention but not to limit this invention. This invention may have various alterations and changes for a person skilled in the art. Within spirit and principles of this invention, any modification, replacement, improvement etc. shall be contained in the protection scope of this invention. Note that similar reference symbols and characters represent to similar items below, and thus once defined in a figure, no further definition and explanation will be given for following figures.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling an unmanned aerial vehicle (UAV), comprising:
    determining, by a processor, a change in a body portion of a user based on a plurality of acquired image frames that include the body portion of the user, wherein the body portion includes a hand portion or a face portion of the user, and wherein determining the change comprises:
        processing the plurality of acquired image frames to obtain coordinate values of the hand portion or the face portion in each image frame; and
        performing a subtraction operation with respect to coordinate values of the hand portion in two sequential image frames of the plurality of image frames to obtain a plurality of pixel differences corresponding to a hand movement;
    obtaining, by the processor, a value of a trigger signal based on the pixel differences, wherein obtaining the value of the trigger signal comprises:
        for each pixel difference of the pixel differences,
        when the pixel difference is greater than a predetermined first threshold value, discarding the pixel difference and keeping the value of the trigger signal unchanged, wherein the predetermined first threshold value corresponds to a pixel length of an arm of the user; or
        when the pixel difference is greater than a predetermined second threshold value and is less than or equal to the predetermined first threshold value, incrementing a counter which counts a number of times that the pixel difference is greater than the predetermined second threshold value and is less than or equal to the predetermined first threshold value, and when a value of the counter is greater than a count threshold value, resetting the counter and increasing the value of the trigger signal by a predetermined increment, wherein the predetermined second threshold value corresponds to a pixel length of the face portion of the user; and
    controlling, by the processor, the UAV based on the value of the trigger signal, wherein a change in the value of the trigger signal corresponds to a movement distance and direction of the UAV, and the movement direction of the UAV is based on whether there is a positive or negative change in the value of the trigger signal.

2. The method according to claim 1, wherein the change in the body portion comprises a change in posture of the body portion.

3. A non-transitory computer-readable medium having processor-executable instructions stored thereon for controlling an unmanned aerial vehicle (UAV), the processor-executable instructions, when executed, facilitating performance of the following:

determining a change in a body portion of a user based on a plurality of acquired image frames that include the body portion of the user, wherein the body portion includes a hand portion or a face portion of the user, and wherein determining the change comprises:
  processing the plurality of acquired image frames to obtain coordinate values of the hand portion or the face portion in each image frame; and
  performing a subtraction operation with respect to coordinate values of the hand portion in two sequential image frames of the plurality of image frames to obtain a plurality of pixel differences corresponding to a hand movement;
obtaining a value of a trigger signal based on the pixel differences, wherein obtaining the value of the trigger signal comprises:
  for each pixel difference of the pixel differences,
    when the pixel difference is greater than a predetermined first threshold value, discarding the pixel difference and keeping the value of the trigger signal unchanged, wherein the predetermined first threshold value corresponds to a pixel length of an arm of the user; or
    when the pixel difference is greater than a predetermined second threshold value and is less than or equal to the predetermined first threshold value, incrementing a counter which counts a number of times that the pixel difference is greater than the predetermined second threshold value and is less than or equal to the predetermined first threshold value, and when a value of the counter is greater than a count threshold value, resetting the counter and increasing the value of the trigger signal by a predetermined increment, wherein the predetermined second threshold value corresponds to a pixel length of the face portion of the user; and
controlling the UAV based on the value of the trigger signal, wherein a change in the value of the trigger signal corresponds to a movement distance and direction of the UAV, and the movement direction of the UAV is based on whether there is a positive or negative change in the value of the trigger signal.

4. The non-transitory computer-readable medium according to claim 3, wherein the change in the body portion comprises a change in posture of the body portion.

5. An unmanned aerial vehicle (UAV), comprising:
a memory; and
a processor coupled to the memory, the processor being configured to, based on instructions stored in the memory:
determine a change in a body portion of a user based on a plurality of acquired image frames that include the body portion of the user, wherein the body portion includes a hand portion or a face portion of the user, and wherein determining the change comprises:
  processing the plurality of acquired image frames to obtain coordinate values of the hand portion or the face portion in each image frame; and
  performing a subtraction operation with respect to coordinate values of the hand portion in two sequential image frames of the plurality of image frames to obtain a plurality of pixel differences corresponding to a hand movement;
obtain a value of a trigger signal based on the pixel differences, wherein obtaining the value of the trigger signal comprises:
  for each pixel difference of the pixel differences,
    when the pixel difference is greater than a predetermined first threshold value, discarding the pixel difference and keeping the value of the trigger signal unchanged, wherein the predetermined first threshold value corresponds to a pixel length of an arm of the user; or
    when the pixel difference is greater than a predetermined second threshold value and is less than or equal to the predetermined first threshold value, incrementing a counter which counts a number of times that the pixel difference is greater than the predetermined second threshold value and is less than or equal to the predetermined first threshold value, and when a value of the counter is greater than a count threshold value, resetting the counter and increasing the value of the trigger signal by a predetermined increment, wherein the predetermined second threshold value corresponds to a pixel length of the face portion of the user; and
control the UAV based on the value of the trigger signal, wherein a change in the value of the trigger signal corresponds to a movement distance and direction of the UAV, and the movement direction of the UAV is based on whether there is a positive or negative change in the value of the trigger signal.

6. The UAV according to claim 5, wherein the change in the body portion comprises a change in posture of the body portion.

* * * * *